United States Patent
Miyaji

(10) Patent No.: US 8,151,777 B2
(45) Date of Patent: Apr. 10, 2012

(54) INTAKE PIPE STRUCTURE OF INTERNAL COMBUSTION ENGINE

(75) Inventor: Yoshihiro Miyaji, Toyota (JP)

(73) Assignee: Toyota Jidosha Kabushiki Kaisha, Aichi-Ken (JP)

( * ) Notice: Subject to any disclaimer, the term of this patent is extended or adjusted under 35 U.S.C. 154(b) by 0 days.

(21) Appl. No.: 12/810,757

(22) PCT Filed: Oct. 29, 2008

(86) PCT No.: PCT/JP2008/003085
§ 371 (c)(1),
(2), (4) Date: Jun. 25, 2010

(87) PCT Pub. No.: WO2009/084144
PCT Pub. Date: Jul. 9, 2009

(65) Prior Publication Data
US 2010/0269804 A1    Oct. 28, 2010

(30) Foreign Application Priority Data
Dec. 27, 2007  (JP) ................. 2007-336974

(51) Int. Cl.
F01M 13/00    (2006.01)
F01M 13/04    (2006.01)
F02M 13/10    (2006.01)
(52) U.S. Cl. ........................................ 123/572
(58) Field of Classification Search .......... 123/572–574, 123/41.86
See application file for complete search history.

(56) References Cited

U.S. PATENT DOCUMENTS

| 1,543,732 | A | | 6/1925 | Staley | |
|---|---|---|---|---|---|
| 3,415,233 | A | * | 12/1968 | Drysdale | 123/572 |
| 4,753,214 | A | | 6/1988 | Langlois et al. | |
| 5,884,612 | A | | 3/1999 | Takeyama et al. | |
| 6,058,917 | A | | 5/2000 | Knowles | |
| 6,148,807 | A | * | 11/2000 | Hazen | 123/572 |

(Continued)

FOREIGN PATENT DOCUMENTS

DE    10 2004 043 545 A1    3/2006
(Continued)

OTHER PUBLICATIONS

Translation of relevant parts of DE 102004043545A1 which was previously submitted on Jun. 24, 2010.

Primary Examiner — M. McMahon
(74) Attorney, Agent, or Firm — Sughrue Mion, PLLC

(57) ABSTRACT

An intake pipe structure of an engine comprises: a joint pipe unit constituted by a return pipe portion and an intake pipe portion for introducing air into the engine. The return pipe portion has one end connected with the intake pipe portion to return blow-by gas from the engine to the intake pipe portion. The return pipe portion has first and second surface sections respectively extending in the range of first and second lengths from the one end of the return pipe portion, the first surface section smoothly and continuously extending, and the second surface section being shorter than the first surface section. The return pipe portion has a curved surface portion enlarged and curved at its downstream side toward the one end of the return pipe portion, and an opening opened at the one end to the intake pipe portion in the form of non-circular shape.

9 Claims, 5 Drawing Sheets

U.S. PATENT DOCUMENTS

| | | | |
|---|---|---|---|
| 2004/0031470 A1* | 2/2004 | Takeyama et al. | 123/572 |
| 2004/0206343 A1* | 10/2004 | Oota et al. | 123/572 |
| 2007/0028903 A1* | 2/2007 | Bruchner et al. | 123/574 |

FOREIGN PATENT DOCUMENTS

| | | |
|---|---|---|
| JP | 2-126012 U | 10/1990 |
| JP | 3-42011 U | 4/1991 |
| JP | 4-47116 U | 4/1992 |
| JP | 5-30411 U | 4/1993 |
| JP | 10-331621 A | 12/1998 |
| JP | 2000-145555 A | 5/2000 |
| JP | 2003-065171 A | 3/2003 |
| JP | 2003-120244 A | 4/2003 |
| JP | 2003-254178 A | 9/2003 |
| JP | 2005-120977 A | 5/2005 |
| JP | 2006-063884 A | 3/2006 |

* cited by examiner

[Fig. 1]
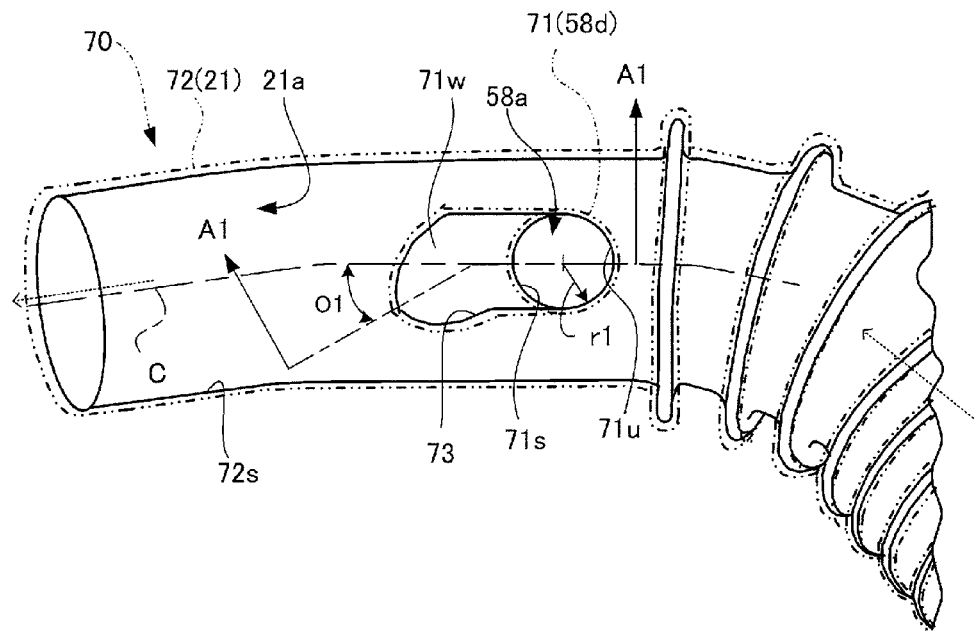
[Fig. 2]
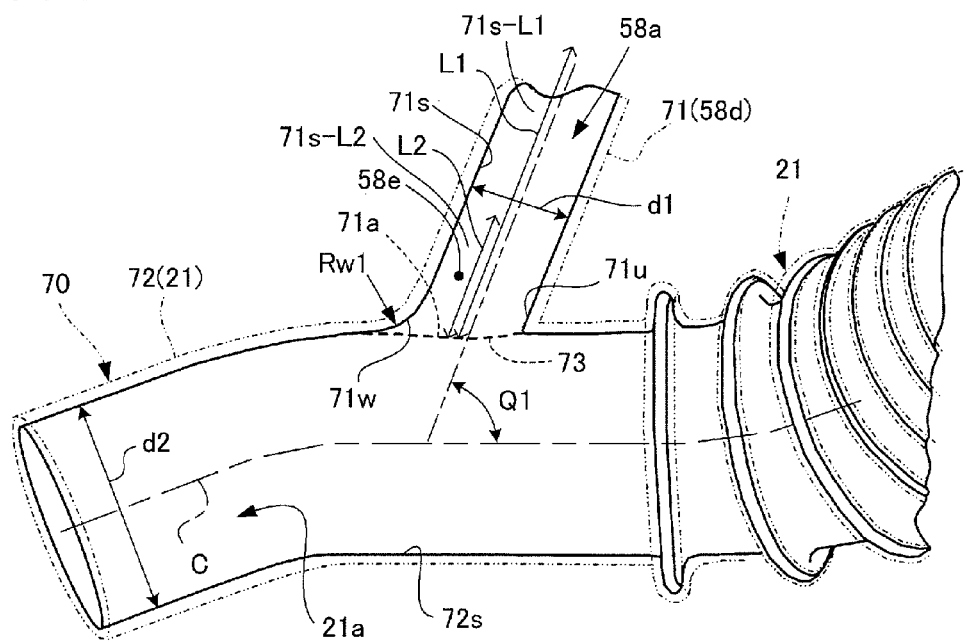

[Fig. 3]
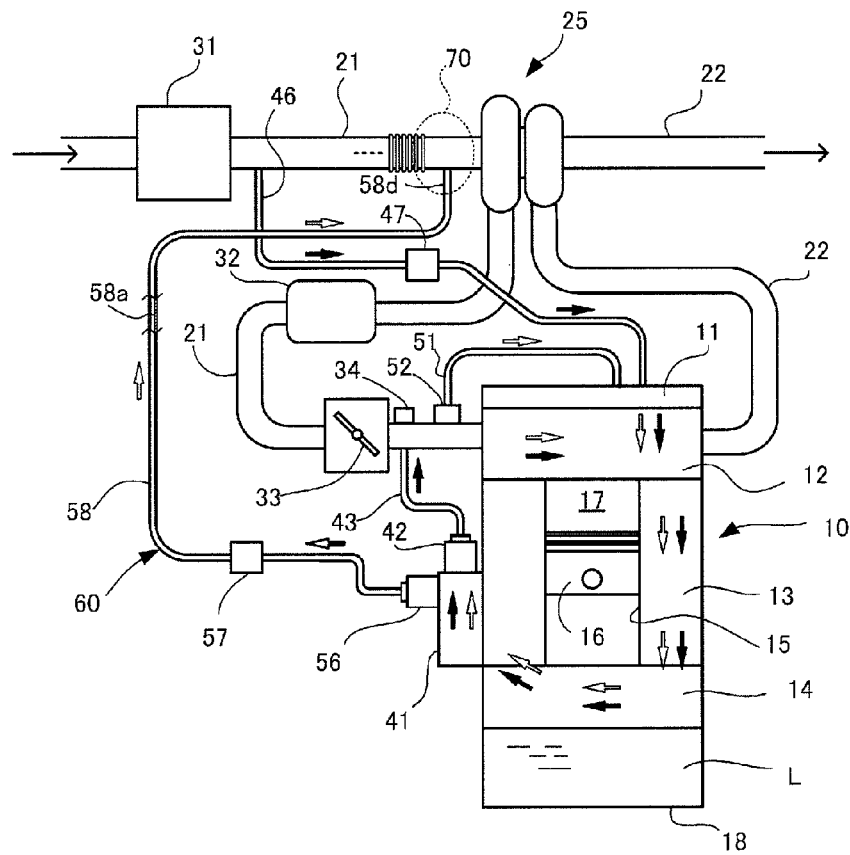
[Fig. 4]
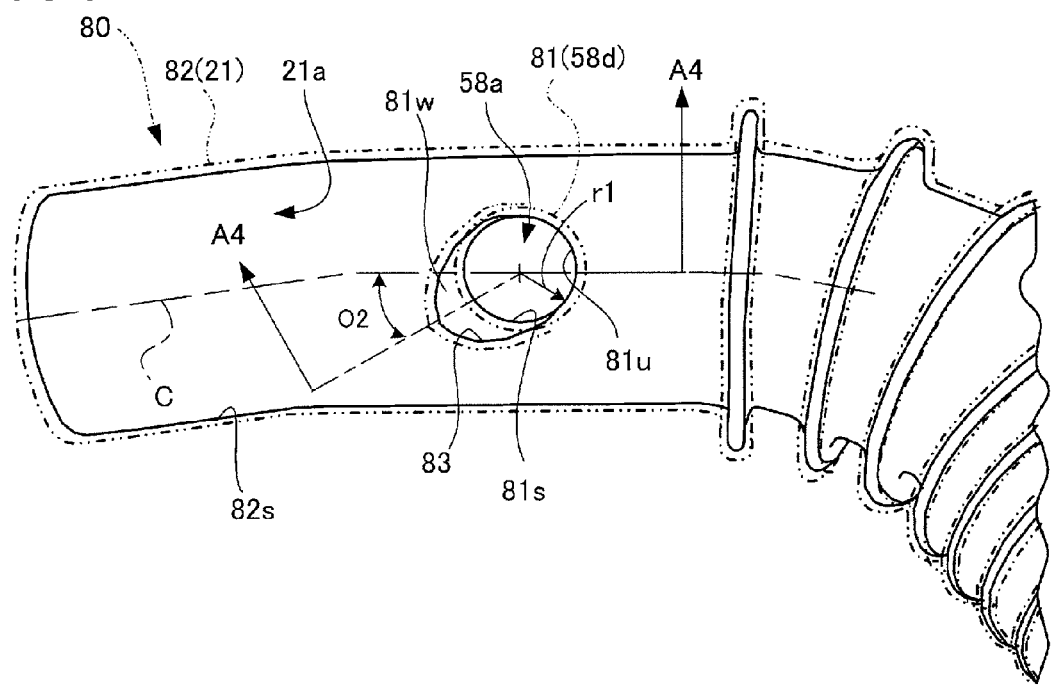

[Fig. 5]
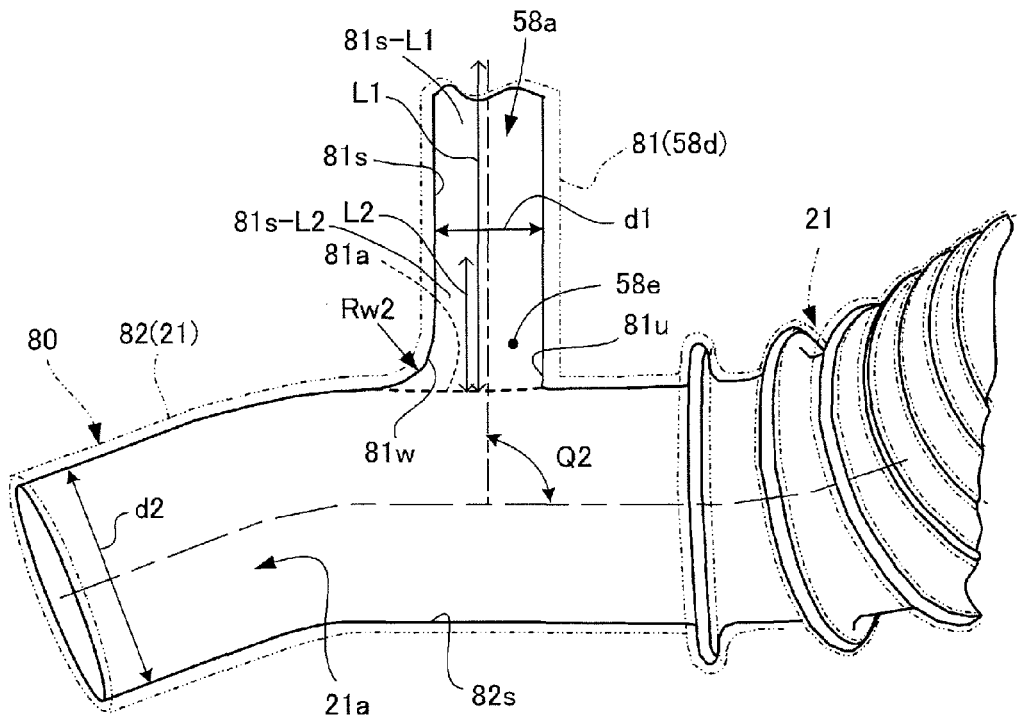
[Fig. 6]
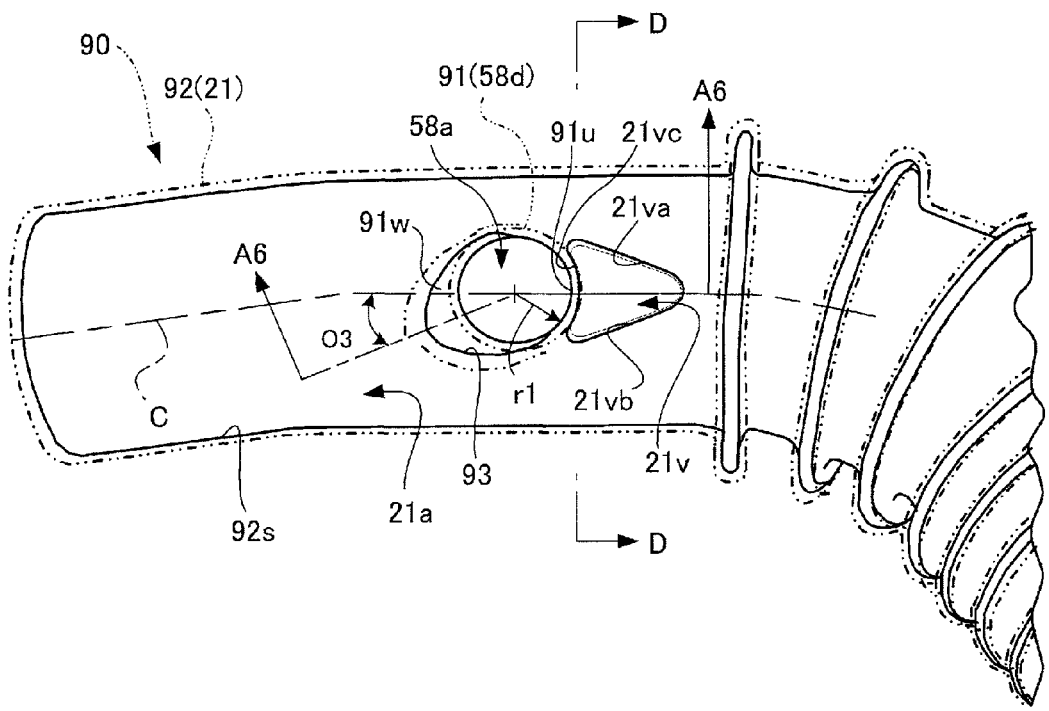

[Fig. 7]
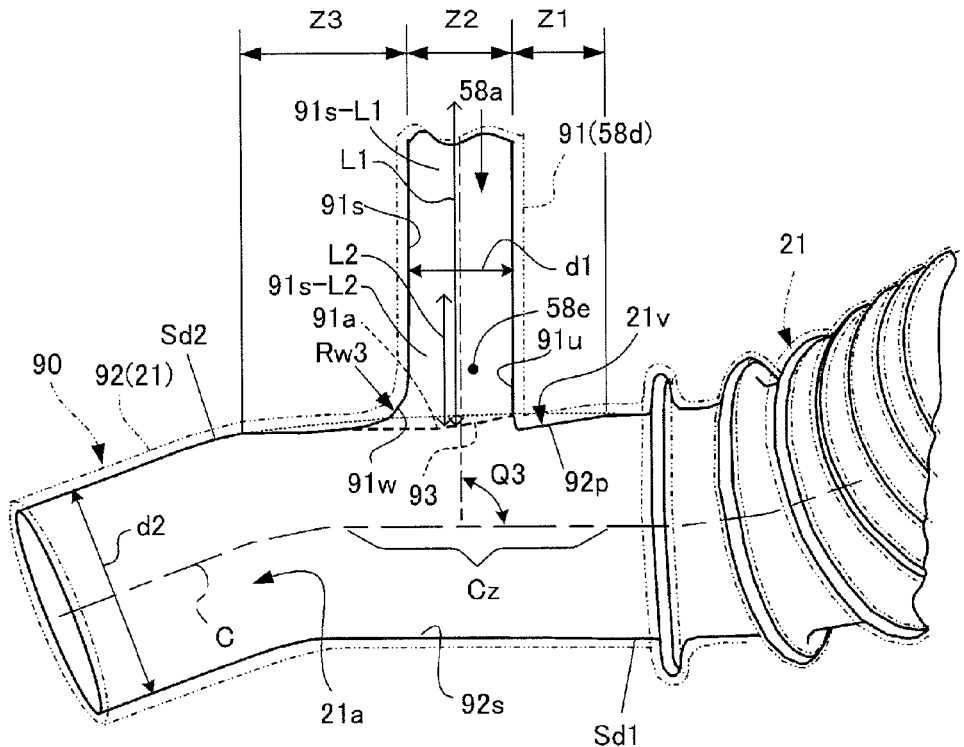
[Fig. 8]
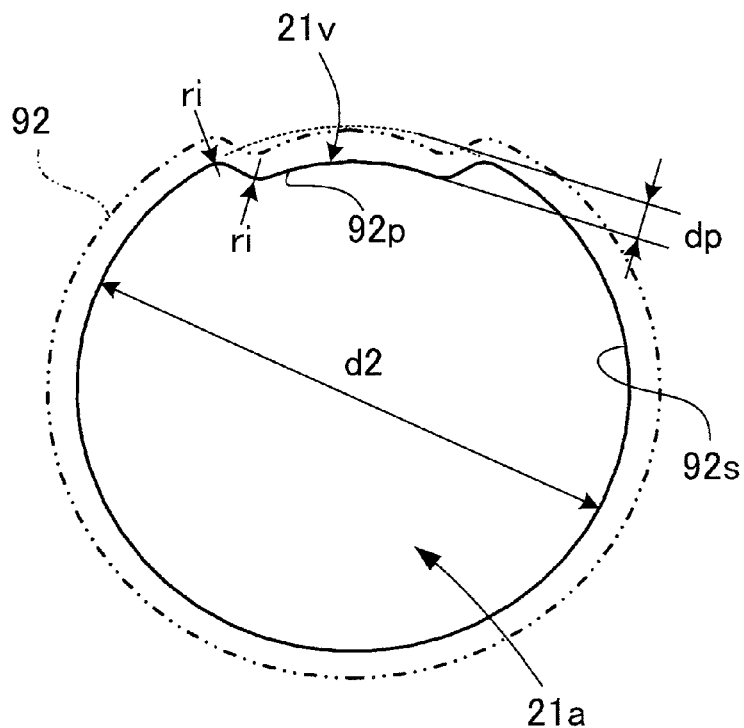

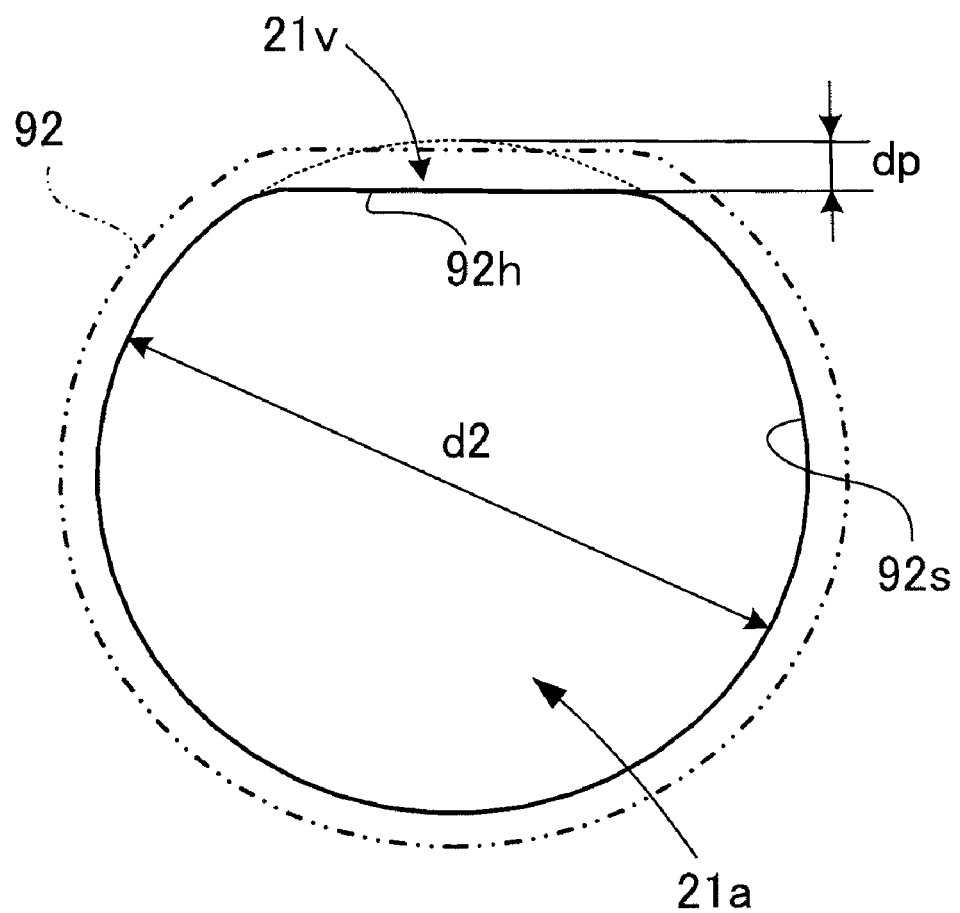
[Fig. 9]

INTAKE PIPE STRUCTURE OF INTERNAL COMBUSTION ENGINE

TECHNICAL FIELD

The present invention relates to an intake pipe structure of an internal combustion engine for use in an automotive vehicle, and particularly to an intake pipe structure provided with a joint pipe unit having a return pipe portion for returning blow-by gas from an internal combustion engine to an intake pipe portion for introducing air to the internal combustion engine.

BACKGROUND ART

In general, the internal combustion engine (hereinafter simply referred to as "engine") of this type has a crankcase in which is collected such a blow-by gas leaked from combustion chambers through clearances between cylinders and pistons during the compression and power strokes. The leaked blow-by gas contains unburned air-fuel mixture and burned exhaust gas as well as a lot of water with a strong acidity, thereby causing deteriorating the quality of engine oil and forming corrosion on elements or parts in the engine. To prevent the quality of the engine oil from being deteriorated and to avoid the elements or parts from being corroded, the engine is usually equipped with a positive crankcase ventilation (PCV) type of blow-bay gas returning apparatus to forcibly ventilate the crankcase for returning the blow-bay gas to each of the combustion chambers of the engine through the return pipe and the intake pipe.

More specifically, in the blow-bay gas returning apparatus, the blow-by gas collected in the crankcase is separated into gas and liquid by an oil separator, and then returned to the inside of the intake pipe through a PCV valve and a PCV hose, i.e., the return pipe for returning the blow-by gas to the engine. The PCV hose has one end portion connected to the intake pipe partly forming the intake pipe structure according to the present invention.

When the automotive vehicle equipped with the blow-bay gas returning apparatus is used in the cold regions, the inner surface of the intake pipe in the vicinity of the one end portion of the PCV hose, i.e., the return pipe is apt to have ice coated and accumulated thereon from water contained in the blow-by gas due to the temperature of the air flowing in the intake pipe dropped below zero degree especially at a time of an idling operation of the engine. When the ice is grown to an excessively large size, the intake pipe and/or the return pipe is frequently blocked by the ice, thereby making it impossible for the blow-by gas to be returned to the combustion chamber of the engine. In case of the large ice blocks being separated from the inner surfaces of the intake pipe and/or the return pipe, the ice blocks may lead to damaging impellers of a supercharger.

To overcome these problems, there have so far proposed a wide variety of intake pipe structures which are devised to avoid as much as possible such a situation in that water frozen becomes ice coated and grown on the inner surfaces of the intake pipe and/or the return pipe to block the intake pipe and/or the return pipe, thereby resulting in an ineffectiveness to the gas returning operation.

One of the conventional intake pipe structures is disclosed by Japanese Utility Model Application Publication No. 5-30411, and comprises a PCV hose having one end portion extending into and opened at the inside of an intake pipe and flared in the form of a trumpet shape to prevent the PCV hose from being blocked by ice blocks at the time of the accretion of ice on the inner surfaces of the intake pipe. Another conventional intake pipe structure is disclosed by Japanese Utility Model Application Publication No. 3-42011, and comprises a PCV hose having one end portion connected with an intake pipe and made of rubber. The PCV hose is attached to the intake pipe with its center axis inclined to the center axis of the intake pipe so that water is flown on and along the inclined inner surface of the hose into the intake pipe without being frozen.

A further conventional intake pipe structure is disclosed by Japanese Utility Model Application Publication No. 2-126012 as having a rubber tube coated on the inner surface of a PCV hose. The rubber tube has a high insulation property which renders it impossible for water to be frozen on the inner surface of the PCV hose. A still further conventional intake pipe structure is disclosed by Japanese Utility Model Application Publication No. 4-47116 to have a water reservoir provided below a gas returning opening to allow water to pass therethrough but to prevent ice rocks grown from frozen water from leaping out of the water reservoir. Also, Japanese Patent Application Publication Nos. 2000-145555, and 2005-120977 disclose a plurality of partition walls provided to form a snaked passage serving to separate blow-by gas into gas and liquid in the vicinity of a joint pipe unit connecting a breather passage with a return passage. Also, an apparatus is known by Japanese Patent Application Publication No. 2003-65171 to have annular protrusions and recesses surrounding a sensor and formed on a projection portion projecting from the inner surface of a surge tank to receive and stop water and oil.

However, the above conventional intake pipe structures of the internal combustion engine encounter such a problem that the blow-by gas return pipe is liable to produce ice therein by water contained in the blow-by gas in the vicinity of its joint portion with the intake pipe when the blow-by gas is mixed with cold fresh air introduced in the joint portion, thereby leading to blocking the return pipe and/or the intake pipe, and thus causing an ineffectiveness to the returning action of the blow-by gas. The ineffectiveness of the returning action of the blow-by gas results in raising an inner pressure in the crankcase, while the ice grown and separated from the inner surfaces of the intake pipe and/or the return pipe possibly gives rise to damages to the impellers of a turbocharger (turbo-supercharger).

If there are annular steps and other configurations of ledge formed on the intake pipe and/or the return pipe in the vicinity of the joint portion thereof, the flow of the blow-by gas is brought out of contact with, viz., separated from the inner surfaces of the intake pipe and/or the return pipe at around the steps and other configurations of ledge where there are formed flow cavities between the flow of the blow-by gas and the inner surfaces of the intake pipe and/or the return pipe. This means that the conventional intake pipe structures encounter such a problem that when the vehicle is used in the cold regions, the flow cavities facilitate forming and growing ice on the inner surfaces of the intake pipe and/or the return pipe near the annular steps or other forms of step since each of the flow cavities has a relatively low pressure. Further, the angle of the return pipe with respect to the intake pipe near the joint portion thereof, the shape of the inner surface of the return pipe near its joint portion with the intake pipe, and the length of a curved inner surface portion of the return pipe may greatly influence on the accretion of ice and the separation of ice blocks on intake pipe and/or the return pipe.

DISCLOSURE OF INVENTION

Problems to be Solved by the Invention

The present invention has been made to solve the above mentioned drawbacks. It is, therefore, an object of the present invention is to provide an intake pipe structure which is excellent in reliability even when the vehicle is used in the cold regions and under other cold environments.

It is another object of the present invention to provide an intake pipe structure which can prevent the accretion of ice and the separation of ice blocks from being generated on intake pipe and/or the return pipe near the joint portion thereof and can solve such a problem as the raised pressure in the crankcase caused by the ineffectiveness of the blow-by gas returning operation and the separation of the ice blocks from the inner surfaces of the intake pipe and/or the return pipe.

Means for Solving the Problem

According to the first aspect of the present invention, there is provided an intake pipe structure of an internal combustion engine, comprising: a joint pipe unit for communicating an intake passage for introducing air into the internal combustion engine with a return passage for returning blow-by gas from the internal combustion engine to the intake passage, the joint pipe unit being constituted by an intake pipe portion forming the intake passage therein, and a return pipe portion forming the return passage therein and connected at its one end with the intake pipe portion, the return pipe portion having an inner diameter and an inner peripheral surface, the inner peripheral surface of the return pipe portion having a first surface section extending smoothly and continuously in the range of a first length larger than the inner diameter from the one end of the return pipe portion, and a second surface section extending in the range of a second length smaller than the first length from the one end of the return pipe portion, the second surface section having a curved surface portion gradually enlarged and curved in the downstream direction of the intake pipe portion toward the one end of the return pipe portion and continuing to the inner peripheral surface of the intake pipe portion, the one end of the return pipe portion having an opening opened to the intake pipe portion in the form of a non-circular shape.

In the intake pipe structure thus constructed, the return pipe portion has an inner peripheral surface having a first surface section extending smoothly and continuously in the range of a first length from the one end of the return pipe portion, and the curved surface portion in the range of a second length is gradually enlarged and curved at the downstream side of the return pipe portion toward the one end of the return pipe portion to continue to the inner peripheral surface of the intake pipe portion, so that the flow of the blow-by gas is brought into tight contact with the inner surface of the joint portion of the return passage and the intake passage, i.e., the inner surface of the joint pipe unit with no flow cavity therebetween and cannot be separated from the inner surface of the joint pipe unit. Accordingly, the intake pipe structure according to the present invention can avoid separation of the blow-by gas flow and can prevent ice from being accreted on the inner surface of the joint pipe unit, thereby making it possible to prevent ice blocks from being separated from the inner surface of the joint pipe unit and to avoid the intake passage from being plugged. As a result, there is neither ineffectiveness to the blow-by gas flow nor raised inner pressure of the crankcase.

According to the second aspect of the present invention, the curved surface portion may be curved in the direction of air flow in the intake pipe portion, and the opening is enlarged at the downstream side of the intake pipe portion and in a direction crossing the center axis of the intake pipe portion.

By the construction of the intake pipe structure mentioned above, the blow-by gas flow in the joint pipe unit is not separated from the inner surface of the joint pipe unit even if the direction of the air flow in the intake passage is deviated from the center axis of the intake passage in the vicinity of the junction of the intake passage and the return passage. This makes it possible to avoid ice accretion on the inner surface of the joint pipe unit stemming from the separation of the blow-by gas.

According to the third aspect of the present invention, the inner peripheral surface of the return pipe portion may have a straight upstream surface section in the range of the second length from the one end of the return pipe portion and positioned at the upstream side of the intake pipe portion, the straight upstream surface section having an extension plane crossing the center axis of the intake pipe portion at a crossing angle between the extension plane of the straight upstream surface section and the center axis of the intake pipe portion at the upstream side of said extension plane set less than 90 degrees.

By the construction of the intake pipe structure mentioned above, the blow-by gas is not separated from the inner surface of the joint pipe unit in the upstream area of the one end portion of the return passage, thereby causing no ice accretion on the inner surface of the joint pipe unit.

According to the fourth aspect of the present invention, the intake pipe portion may have an inner protuberant surface section positioned at the upstream side of and in the vicinity of the opening of the return pipe portion and inclined with the distance between the center axis of the intake pipe portion and the inclined inner protuberant surface section diminished toward the opening of the return pipe portion.

By the construction of the intake pipe structure mentioned above, the air flow can be prevented from being introduced into the opening of the return pipe portion due to the air flow deviated away from the inner protuberant surface section, thereby preventing ice from being accreted on the inner surface of the joint pipe unit.

According to the fifth aspect of the present invention, there is provided an intake pipe structure of an internal combustion engine, comprising: a joint pipe unit for communicating an intake passage for introducing air into the internal combustion engine with a return passage for returning blow-by gas from the internal combustion engine to the intake passage, the joint pipe unit being constituted by an intake pipe portion forming the intake passage therein, and a return pipe portion forming the return passage therein and connected at its one end with the intake pipe portion, the return pipe portion having an inner diameter and an inner peripheral surface, the inner peripheral surface of the return pipe portion having a first surface section extending smoothly and continuously in the range of a first length larger than the inner diameter from the one end of the return pipe portion, and the one end of the return pipe portion having an opening opened to the intake pipe portion, the intake pipe portion having an inner protuberant surface section positioned at the upstream side of and in the vicinity of the opening of the return pipe portion and protruding into the intake pipe portion.

By the construction of the intake pipe structure mentioned above, the first surface section of the inner peripheral surface of the return pipe portion extending smoothly and continuously in the range of a first length from the one end of the return pipe portion makes it difficult for the flow of the blow-by gas passing through the return passage to be separated from the inner surface of the joint pipe unit. The inner protuberant surface section of the intake pipe portion gradually inclined toward the opening of the return pipe also makes it difficult for the air flow passing through the intake passage to be introduced into the opening of the return pipe portion due to the air flow deviated away from the inner protuberant surface section. This makes it possible to avoid ice accretion on the inner surface of the joint pipe unit stemming from the separation of the blow-by gas.

According to the sixth aspect of the present invention, the inner protuberant surface section of the intake pipe portion may be inclined with the distance between the center axis of the intake pipe portion and the inner protuberant surface section diminished toward the opening of the return pipe portion.

The construction of the intake pipe structure mentioned above makes it difficult for the air flow passing through the intake passage to be introduced into the opening of the return pipe portion.

According to the seventh aspect of the present invention, the inner protuberant surface section of the intake pipe portion may become wide in the circumferential direction toward the opening of the return pipe portion.

Also, the construction of the intake pipe structure mentioned above makes it difficult for the air flow passing through the intake passage to be introduced into the opening of the return pipe portion since the air flow is deviated away from the inner protuberant surface section.

According to the eighth aspect of the present invention, the inner peripheral surface of the return pipe portion may have a second surface section extending in the range of a second length smaller than the first length from the one end of the return pipe portion, the second surface section having a curved surface portion gradually enlarged and curved in the downstream direction of the intake pipe portion toward the one end of the return pipe portion and continuing to the inner peripheral surface of the intake pipe portion.

By the construction of the intake pipe structure mentioned above, the curved surface portion in the range of the second length is gradually enlarged and curved at the downstream side of the return pipe portion toward the one end of the return pipe portion to continue to the inner peripheral surface of the intake pipe portion, so that the flow of the blow-by gas is brought into tight contact with the inner surface of the joint portion of the return passage and the intake passage, i.e., the inner surface of the joint pipe unit with no flow cavity therebetween and cannot be separated from the inner surface of the joint pipe unit. This makes it possible to avoid ice accretion on the inner surface of the joint pipe unit stemming from the separation of the blow-by gas.

The Effect of the Invention

According to the present invention, the return pipe portion has an inner peripheral surface having a first surface section extending smoothly and continuously in the range of a first length from the one end of the return pipe portion, and the curved surface portion in the range of a second length is gradually enlarged and curved at the downstream side of the return pipe portion toward the one end of the return pipe portion to continue to the inner peripheral surface of the intake pipe portion, so that the flow of the blow-by gas is brought into tight contact with the inner surface of the joint portion of the return passage and the intake passage, i.e., the inner surface of the joint pipe unit with no flow cavity therebetween and cannot be separated from the inner surface of the joint pipe unit. Accordingly, the intake pipe structure according to the present invention can avoid separation of the blow-by gas flow and can prevent ice from being accreted on the inner surface of the joint pipe unit, thereby making it possible to prevent ice blocks from being separated from the inner surface of the joint pipe unit and to avoid the intake passage from being plugged. As a result, there is neither ineffectiveness to the blow-by gas flow nor raised inner pressure of the crankcase to ensure that the intake pipe structure according to the present invention is excellent in reliability when used in the cold regions and environments.

Also according to the present invention, the first surface section of the inner peripheral surface of the return pipe portion extending smoothly and continuously in the range of a first length from the one end of the return pipe portion can prevent separation of the blow-by gas passing through the return passage, while the inner protuberant surface section of the intake pipe portion gradually inclined toward the opening of the return pipe also makes it difficult for the air flow passing through the return passage to be introduced into the opening of the return pipe portion due to the air flow deviated away from the inner protuberant surface section. This makes it possible to avoid ice accretion on the inner surface of the joint pipe unit stemming from the separation of the blow-by gas. As a result, there is neither ineffectiveness to the blow-by gas flow nor raised inner pressure of the crankcase to ensure that the intake pipe structure according to the present invention is excellent in reliability when used in the cold regions and environments.

BRIEF DESCRIPTION OF THE DRAWINGS

The objects, features and advantages of the present invention will become apparent as the description proceeds when taken in conjunction with the accompanying drawings, in which:

FIG. 1 is a schematic plan view of essential portions forming part of the intake pipe structure of the internal combustion engine according to the first embodiment of the present invention;

FIG. 2 is a schematic side view of essential portions forming part of the intake pipe structure of the internal combustion engine according to the first embodiment of the present invention;

FIG. 3 is a schematic view showing construction elements forming the internal combustion engine according to the first embodiment of the present invention;

FIG. 4 is a schematic plan view of essential portions forming part of the intake pipe structure of the internal combustion engine according to the second embodiment of the present invention;

FIG. 5 is a schematic side view of essential portions forming part of the intake pipe structure of the internal combustion engine according to the second embodiment of the present invention;

FIG. 6 is a schematic plan view of essential portions forming part of the intake pipe structure of the internal combustion engine according to the third embodiment of the present invention;

FIG. 7 is a schematic side view of essential portions forming part of the intake pipe structure of the internal combustion engine according to the third embodiment of the present invention;

FIG. 8 is a cross-sectional view taken along the lines D-D of FIG. 6; and

FIG. 9 is a cross-sectional view similar to FIG. 8 but showing another embodiment.

BEST MODE FOR CARRYING OUT THE INVENTION

One preferred embodiment of the intake pipe structure of the internal combustion engine according to the present invention will be described in detail with reference to the accompanying drawings.

First Preferred Embodiment

FIG. 1 is a schematic plan view of essential portions forming part of the intake pipe structure of the internal combustion engine according to the first embodiment of the present invention, FIG. 2 is a schematic side view of essential portions forming part of the intake pipe structure of the internal combustion engine according to the first embodiment of the present invention, and FIG. 3 is a schematic view showing construction elements forming the internal combustion engine according to the first embodiment of the present invention.

The construction of the intake pipe structure of the internal combustion engine according to the present embodiment will now be described hereinafter.

The intake pipe structure of the internal combustion engine according to the present embodiment is constructed as shown in FIGS. 1 and 2 and assembled with an engine 10. The whole construction of the engine 10 is schematically shown in FIG. 3 and comprises a cylinder head 12 having a head cover 11 mounted thereon, a cylinder block 13, and a crankcase 14. The cylinder head 12 and the cylinder block 13 in combination form a plurality of cylinders 15 only one of which is shown in FIG. 3.

Each of the cylinders 15 has housed therein a piston 16 which is drivably connected with a crank shaft through a connecting rod not shown in the crankcase 14. The cylinder head 12 is adapted to accommodate therein a plurality of fuel injection valves to be driven by a crank shaft in synchronism with or independently of the crank shaft.

At the lower portion of the crankcase 14 is provided an oil pan 18 for reserving a lubricant oil L. The engine 10 has an oil pump such as a gear pump to be driven by the crank shaft to supply the lubricant oil L to the bearings of the cam shafts of the fuel injection valves, the rocker arms, the crank shafts, and other various rotating and sliding portions forming part of the engine 10 for lubrication thereof.

Each of the cylinders 15 has a cylinder chamber 17 above the piston 16 to be introduced air through an intake pipe 21 and injected fuel through an injector not shown in response to the stroke of the piston 16. The air and fuel mixture in the cylinder chamber 17 is burned under the compression stroke of the piston 16 and then generate exhaust gas to be discharged through an exhaust pipe 22.

Between the intake pipe 21 and the exhaust pipe 22 is provided a turbocharger 25. The turbocharger 25 is known in the art and constructed to accommodate therein a gas turbine to be rotated with the energy of the exhaust gas from the engine 10 and an air compressor drivably connected with the gas turbine to be rotated by the gas turbine for sucking air into the cylinder chamber 17 through the intake pipe 21. The turbocharger 25 is provided on the passage between the intake pipe 21 and the exhaust pipe 22 to be operable when required for example with a changing system to change the turbocharger 25 into the operation state or the non-operation state. In addition to the turbocharger 25, the intake pipe 21 is constructed to have an air cleaner 31, an inter cooler 32, a throttle valve 33, and an air pressure sensor 34 for detecting the air pressure in the intake pipe 21 arranged thereon.

The engine 10 is formed with a ventilation passage (not shown) held in communication with the inner chambers of the cylinder head 12 and the crankcase 14 so that the engine 10 is ventilated by air flows generated in directions shown in arrows indicated in black and white in FIG. 3.

The engine 10 is provided at its side portion with a PCV oil separator 41 and a PCV valve 42 acting as a blow-by gas returning valve. The PCV valve 42 and the intake pipe 21 at the downstream side of the throttle valve 33 are connected by a PCV hose 43.

The PCV valve 42 is opened when the inner pressure of the intake pipe 21 is lower than the predetermined pressure (atmospheric pressure, i.e., zero negative pressure) so that the PCV valve 42 can return the blow-by gas leaked from the cylinder chamber 17 to the crankcase 14 through the clearances between the piston 16 and the cylinder 15 to the intake pipe 21 at the downstream side of the throttle valve 33. The PCV oil separator 41 functions to remove an oil component from the blow-by gas flowing toward the PCV valve 42 from the upper portion of the crankcase 14.

To the intake pipe 21 in the vicinity of and at the downstream side of the air cleaner 31 is connected a hose 46 which can introduce air in the intake pipe 21 at the upstream side of the throttle valve 33 into the head cover 11 provided in the engine 10. The hose 46 has a one-way valve 47 allowing only air flow to be introduced into the head cover 11 from the intake pipe 21. The hose 46, the one-way valve 47, the PCV valve 42, and the PCV hose 43 collectively constitute a ventilation system to be operated at the time of a natural intake of air into the engine 10.

Between the intake pipe 21 at the downstream side of the throttle valve 33 and the head cover 11 are provided a hose 51 and a ventilation valve 52 operable under the operation of the turbocharger 25. Between the PCV oil separator 41 and the intake pipe 21 at the upstream side of the turbocharger 25 are provided a PCV valve 56, a one-way valve 57 and a PCV hose 58. When the turbocharger 25 is operated to supercharge air to the engine 10 and the air pressure of the air in the intake pipe 21 at the downstream side of the throttle valve 33 is maintained at a positive value, fresh air is introduced into the head cover 11, i.e., the engine 10 through the hose 51 and the ventilation valve 52 while the blow-by gas is returned to the intake pipe 21 at the upstream side of the turbocharger 25 from the upper portion of the crankcase 14 through the PCV oil separator 41, the PCV valve 56, the one-way valve 57 and the PCV hose 58. The hose 51, the ventilation valve 52, the PCV valve 56, the one-way valve 57 and the PCV hose 58 constitute as a whole air introduction means 60 for introducing the fresh air into the head cover 11 when the air pressure of the air in the intake pipe 21 at the downstream side of the throttle valve 33 becomes at a positive value under the operation of the turbocharger 25.

The intake pipe structure of the internal combustion engine according to the present embodiment mentioned above is adopted in the engine 10 as a joint pipe unit 70 serving to connect the end portion 58d of the PCV hose 58 with the intake pipe 21, for example, at the upstream side of the turbocharger 25.

In FIGS. 1 and 2, the intake passage 21a in the intake pipe 21 and the one end portion 58e of the return passage 58a in the PCV hose 58 are shown in solid lines, respectively, while the intake pipe 21 surrounding and forming the intake passage 21a and the one end portion 58d of the PCV hose 58 surrounding and forming the one end portion 58e of the return passage 58a are shown in phantom lines, respectively. The intake pipe 21 is illustrated as an example to have a longitudinal portion partly in the form of a bellow-like shape at the right end portion of FIGS. 1 and 2. According to the present invention, any other shape and type of intake pipe may be used in lieu of this bellow-like shaped intake pipe 21.

As shown in FIGS. 1 and 2, the joint pipe unit 70 is constituted by a return pipe portion 71 and an intake pipe portion 72. The return pipe portion 71 forms part of the one end portion 58d of the PCV hose 58, i.e., return pipe 58 forming the return passage 58a therein, while the intake pipe portion 72 forms part of the intake pipe 21 at the upstream side of the turbocharger 25 forming the intake passage 21a therein. The return passage 58a functions to return to the engine 10 the blow-by gas discharged from the cylinder chamber of the engine 10.

From the foregoing description, it is to be noted that the joint pipe unit 70 forms a joint portion of the one end portion 58e of the return passage 58a and the intake passage 21a of the engine 10 at the upstream side of the turbocharger 25. Also, it will be understood that the joint pipe unit 70 is for communicating an intake passage for introducing air into the engine 10 with a return passage 58a for returning blow-by gas from the engine 10 to the intake passage 21a as defined in the present invention.

The return pipe portion 71 of the joint pipe unit 70 is connected at its one end 71a with the intake pipe portion 72. The return pipe portion 71 has an inner diameter d1, while the intake pipe portion 72 has an inner diameter d2. The return pipe portion 71 has an inner peripheral surface 71s having a first surface section 71s-L1 extending smoothly and continuously in the range of a first length L1 from the one end 71a of the return pipe portion 71 sufficiently larger than the inner diameter d1, for example, in the range of a first length L1 sufficiently larger than the inner diameter d2 of the intake pipe portion 72. Here, the expression "a first surface section 71s-L1 extending smoothly and continuously" is intended to mean that the first surface section 71s-L1 has neither annular steps nor other configurations of ledge in the range of the first length L1. It will therefore be understood that neither annular steps nor other shaped steps on the first surface section 71s-L1 leads to no flow cavity on the first surface section 71s-L1, thereby making it possible to prevent the accretion of ice and the separation of ice blocks from being generated on intake pipe 72 and/or the return pipe 71. The first length L1 is preferably more than a few times (e.g. three times) the inner diameter d1 of the return pipe portion 71, and may be set in accordance with the level of the heat conductivity from the return pipe portion 71 to the intake pipe portion 72.

Further, the inner peripheral surface 71s of the return pipe portion 71 has a second surface section 71s-L2 extending in the range of a second length L2 smaller than the first length L1 from the one end 71a of the return pipe portion 71. The downstream and upstream sides respectively indicate left and right sides since air is introduced from the right side to the left side in the intake pipe portion 72 toward the engine 10 in FIGS. 1 and 2. The second surface section 71s-L2 has a downstream side half close to the engine 10 and an upstream side half remote from the engine 10. The second surface section 71s-L2 has a curved surface portion 71w at the downstream side half of the return pipe portion 71, the curved surface portion 71w being gradually enlarged and curved at the downstream side of the return pipe portion 71, viz., from the right side to the left side in FIG. 2, toward the one end 71a of the return pipe portion 71 to be connected with the inner peripheral surface 72s of the intake pipe portion 72. This means that the cross-section area of the inner peripheral surface 71s of the return pipe portion 71 taken on the plane parallel to the center axis of the intake pipe portion 72 near the one end 71a of the return pipe portion 71 gradually becomes large toward the one end 71a of the return pipe portion 71. As seen from FIG. 2, the curved surface portion 71w of the return pipe portion 71 is curved or flared near the one end 71a at the downstream side thereof and connected at the one end 71a with the intake pipe portion 72. In other words, the curved surface portion 71w is curved or flared in the direction of the air flow in the intake passage 21a of the intake pipe 21.

The curved surface portion 71w thus curved has a radius of curvature Rw1 (see FIG. 2), on the cross-section taken on the lines A-A in FIG. 1, set at a value almost the same as the radius r1 of the first surface section 71s-L1 of the inner peripheral surface 71s of the return pipe portion 71. The curvature Rw1 may be set at a value somewhat smaller than the radius r1 of the first surface section 71s-L1 of the inner peripheral surface 71s of the return pipe portion 71 or may be set at a value in the range from the radius r1 of the first surface section 71s-L1 to the diameter d1 of the inner peripheral surface 71s of the return pipe portion 71 according to the present invention. The shape of the curved surface portion 71w formed on the inner peripheral surface 71s of the return pipe portion 71 near the one end 71a of the return pipe portion 71 is determined on the basis of an incidence angle of the return pipe portion 71 with respect to the intake pipe portion 72 at the junction of the return pipe portion 71 and the intake pipe portion 72. The curved surface portion 71w gradually enlarged and curved at the downstream side of the return pipe portion 71, and thus expanded in cross-section toward the one end 71a of the return pipe portion 71 causes the blow-by gas flow in the return pipe portion 71 to smoothly join the air flow in the intake passage 21a of the intake pipe 21. The return pipe portion 71 is shown in FIGS. 1 and 2 as having an opening 73 at its one end 71a and thus opened on the inner peripheral surface 72s of the intake pipe portion 72. The opening 73 is in the form of non-circular shape as best shown in FIG. 1. The opening 73 is enlarged and expanded in a direction angularly deviated from the center axis C of the intake passage 21a at an angle O1 (e.g. 30 degrees) between the expansion direction of the opening 73 and the center axis C of the intake passage 21a.

On the other hand, the inner peripheral surface 71s of the return pipe portion 71 has a straight upstream surface portion 71u in the range of a second length L2 from the one end 71s of the return pipe portion 71 at the upstream side half of the return pipe portion 71, viz., opposite to the curved surface portion 71w. The straight upstream surface portion 71u has an extension plane crossing the center axis C of the intake passage 21a at the downstream side of the straight upstream surface portion 71u. The crossing angle Q1 between the extension plane of the straight upstream surface portion 71u and the center axis C of the intake passage 21a is set at an angle smaller than 90 degrees as shown in FIG. 2. The straight upstream surface portion 71u of the inner peripheral surface 71s of the return pipe portion 71 is connected with the inner peripheral surface 72s of the intake pipe portion 72 at a ridge portion in the form of roughly an arc shape in cross-section and having a radius of curvature sufficiently smaller than the inner radius r1 of the return pipe portion 71.

The operation of the intake pipe structure according to the first embodiment of the present invention will then be described.

In the intake pipe structure according to the first embodiment of the present invention mentioned above, the return pipe portion 71 has an inner peripheral surface 71s having a first surface section 71s-L1 extending smoothly and continuously in the range of a first length L1 from the one end 71a of the return pipe portion 71, and the curved surface portion 71w in the range of a second length L2 is gradually enlarged and curved at the downstream side of the return pipe portion 71 toward the one end 71a of the return pipe portion 71 to continue to the inner peripheral surface 72s of the intake pipe portion 72, so that the flow of the blow-by gas is brought into tight contact with, viz., tightly fits the inner surface of the joint portion of the return pipe portion 71 and the intake pipe portion 72, i.e., the inner surface of the joint pipe unit 70 with no flow cavity therebetween and cannot be separated from the inner surface of the joint pipe unit 70. Accordingly, the intake pipe structure according to the first embodiment of the present invention can avoid separation of the gas flow from the inner surface of the joint portion of the return pipe portion 71 and the intake pipe portion 72 and can prevent ice from being accreted on the inner surface of the joint pipe unit 70, thereby making it possible to prevent ice blocks from being separated from the inner surface of the joint pipe unit 70 and to avoid the return passage 58a and the intake passage 21a from being plugged. As a result, there is neither ineffectiveness to the blow-by gas flow nor raised inner pressure of the crankcase 14.

As seen from the foregoing description, the curved surface portion 71w of the inner peripheral surface 71s of the return pipe portion 71 is gradually enlarged in the direction of air flow in the intake passage 21a at a radius of curvature Rw1 almost the same as the radius r1 of the first surface section 71s-L1 of the inner peripheral surface 71s of the return pipe portion 71, and the opening 73 formed at the one end 71a of the return pipe portion 71 is opened in the downstream direction of the intake passage 21a of the intake pipe 21 with the center axis crossing the center axis C of the intake passage 21a. Accordingly, the blow-by gas in the joint pipe unit 70 is not separated from the inner surface of the joint pipe unit 70 even if the direction of the air flow in the intake passage 21a is deviated from the center axis of the intake passage 21a in the vicinity of the junction of the intake passage 21a and the return passage 58a. This makes it possible to avoid ice accretion on the inner surface of the joint pipe unit 70 stemming from the separation of the blow-by gas. The radius of curvature Rw1 exceeding the inner diameter d1 of the return pipe portion 71 may cause the flow to be turbulent and thus to form a flow cavity at around the enlarged and curved portion of the return pipe portion 71.

The inner peripheral surface 71s of the return pipe portion 71 has a straight upstream surface portion 71u in the range of a second length L2 from the one end 71a of the return pipe portion 71 and has an extension crossed with the center axis C of the intake passage 21a at the downstream side of the straight upstream surface portion 71u, and the crossing angle Q1 between the extension of the straight upstream surface portion 71u and the center axis C of the intake passage 21a is set at an angle smaller than 90 degrees, so that the blow-by gas is not separated from the inner surface of the joint pipe unit 70 in the upstream area of the one end portion 58e of the return passage 58, thereby causing no ice accretion on the inner surface of the joint pipe unit 70.

As has been explained in the above description, the intake pipe structure of the internal combustion engine according to the present embodiment is constructed to comprise a return pipe portion 71 having an inner peripheral surface 71s extending smoothly and continuously in the range of a first length L1 from the one end 71a of the return pipe portion 71 sufficiently longer than the inner diameter d1, and having a curved surface portion 71w extending in the range of a second length L2 smaller than the first length L1 from the one end 71a of the return pipe portion 71 and at the downstream side half of the return pipe portion 71, the curved surface portion 71w being gradually enlarged and curved at the downstream side of the return pipe portion 71 toward the one end 71a of the return pipe portion 71 to be connected with the inner peripheral surface 72s of the intake pipe portion 72. Therefore, the intake pipe structure can avoid separation of the gas flow and can prevent ice from being accreted on the inner surface of the joint pipe unit 70, thereby making it possible to prevent ice blocks from being separated from the inner surface of the joint pipe unit 70 and to avoid the intake passage 21a from being plugged. As a result, there is neither ineffectiveness to the blow-by gas flow nor raised inner pressure of the crankcase 14.

While there has been described about the joint pipe unit 70 having a return pipe portion 71 and an intake pipe portion 72 in the first embodiment of the intake pipe structure according to the present invention, the first embodiment may be replaced by another embodiment which comprises a return pipe and an intake pipe directly connected with each other with no use of the above mentioned joint pipe unit 70 according to the present invention. Further, the joint pipe unit 70 may be provided in a housing block integrally formed with an engine block accommodating therein the engine 10 according to the present invention.

Second Preferred Embodiment

FIG. 4 is a schematic plan view of essential portions forming part of the intake pipe structure of the internal combustion engine according to the second embodiment of the present invention, and FIG. 5 is a schematic side view of essential portions forming part of the intake pipe structure of the internal combustion engine according to the second embodiment of the present invention.

The intake pipe structure of the internal combustion engine according to the second embodiment of the present invention is assembled with the engine 10 explained during the description of the first embodiment of the present invention. The constitution elements or parts similar to those of the intake pipe structure of the internal combustion engine according to the first embodiment of the present invention and appearing during the description of the intake pipe structure of the internal combustion engine according to the second embodiment of the present invention will be explained in FIGS. 4 and 5 with the reference numerals the same as the reference numerals in FIGS. 1 to 3 appearing during the description of the intake pipe structure of the internal combustion engine according to the first embodiment of the present invention.

In FIGS. 4 and 5, the intake passage 21a in the intake pipe 21 and the one end portion 58e of the return passage 58a in the PCV hose 58 are shown in solid lines, respectively, while the intake pipe 21 surrounding and forming the intake passage 21a and the one end portion 58d of the PCV hose 58 surrounding and forming the one end portion 58e of the return passage 58a are shown in phantom lines, respectively.

As shown in FIGS. 4 and 5, the joint pipe unit 80 is constituted by a return pipe portion 81 and an intake pipe portion 82. The return pipe portion 81 forms part of the one end portion 58d of the PCV hose 58, i.e., return pipe 58 forming the return passage 58a therein, while the intake pipe portion 82 forms part of the intake pipe 21 at the upstream side of the turbocharger 25 and forming the intake passage 21a therein. The return passage 58a functions to return to the engine 10 the blow-by gas discharged from the cylinder chamber of the engine 10.

The return pipe portion 81 of the joint pipe unit 80 is connected at its one end 81a with the intake pipe portion 82.

The return pipe portion 81 has an inner diameter d1, while the intake pipe portion 82 has an inner diameter d2. The return pipe portion 81 has an inner peripheral surface 81s having a first surface section 81s-L1 extending smoothly and continuously in the range of a first length L1 from the one end 81a of the return pipe portion 81 sufficiently larger than the inner diameter d1, for example, in the range of a first length L1 sufficiently larger than the inner diameter d2 of the intake pipe portion 82. Here, the expression "a first surface section 81s-L1 extending smoothly and continuously" is intended to mean that the first surface section 81s-L1 has neither annular steps nor other configurations of ledge in the range of the first length L1. It will therefore be understood that neither annular steps nor other configurations of ledge on the first surface section 81s-L1 leads to no flow cavity on the first surface section 81s-L1, thereby making it possible to prevent the accretion of ice and the separation of ice blocks from being generated on intake pipe 82 and/or the return pipe 81.

Further, the inner peripheral surface 81s of the return pipe portion 81 has a second surface section 81s-L2 extending in the range of a second length L2 smaller than the first length L1 from the one end 81a of the return pipe portion 81. The second surface section 81s-L2 has a downstream side half close to the engine 10 and an upstream side half remote from the engine 10. The second surface section 81s-L2 has a curved surface portion 81w at the downstream side half of the return pipe portion 81, the curved surface portion 81w being gradually enlarged and curved at the downstream side of the return pipe portion 81, viz., from the right side to the left side in FIG. 4, toward the one end 81a of the return pipe portion 81 to be connected with the inner peripheral surface 82s of the intake pipe portion 82. As seen from FIG. 5, the curved surface portion 81w of the return pipe portion 81 is curved or flared near the one end 81a at the downstream side thereof and connected at the one end 81a with the intake pipe portion 82. In other words, the curved surface portion 81w is curved or flared in the direction of the air flow in the intake passage 21a of the intake pipe 21. The curved surface portion 81w thus curved has a radius of curvature Rw2 (see FIG. 5), on the cross-section taken on the lines A4-A4 in FIG. 4, set at a value almost the same as the radius r1 of the first surface section 81s-L1 of the inner peripheral surface 81s of the return pipe portion 81. The return pipe portion 81 is shown in FIGS. 4 and 5 as having an opening 83 at its one end 81a and thus opened on the inner peripheral surface 82s of the intake pipe portion 82. The opening 83 is in the form of a non-circular shape as best shown in FIG. 4. The opening 83 is enlarged and curved in a direction angularly deviated from the center axis C of the intake passage 21a at an angle O2 between the expansion direction of the opening 83 and the center axis C of the intake passage 21a.

The inner peripheral surface 81s of the return pipe portion 81 has a straight upstream surface portion 81u in the range of a second length L2 from the one end 81s of the return pipe portion 81 at the upstream side half of the return pipe portion 81, viz., opposite to the curved surface portion 81w. The straight upstream surface portion 81u has an extension plane crossing the center axis C of the intake passage 21a at the downstream side of the straight upstream surface portion 81u. The crossing angle Q2 between the extension plane of the straight upstream surface portion 81u and the center axis C of the intake passage 21a is set at an angle of, for example, 90 degrees. The straight upstream surface portion 81u of the inner peripheral surface 81s of the return pipe portion 81 is connected with the inner peripheral surface 82s of the intake pipe portion 82 at a ridge portion in the form of roughly an arc shape in cross-section and having a radius of curvature sufficiently smaller than the inner radius r1 of the return pipe portion 81.

In the intake pipe structure according to the second embodiment of the present invention mentioned above, the return pipe portion 81 has an inner peripheral surface 81s having a first surface section 81s-L1 extending smoothly and continuously in the range of a first length L1 from the one end 81a of the return pipe portion 81, and the curved surface portion 81w in the range of a second length L2 is gradually enlarged and curved at the downstream side of the return pipe portion 81 toward the one end 81a of the return pipe portion 81 to continue to the inner peripheral surface 82s of the intake pipe portion 82, so that the flow of the blow-by gas is brought into tight contact with, viz., tightly fits the inner surface of the joint portion of the return passage 58a and the intake passage 21a, i.e., the inner surface of the joint pipe unit 80 with no flow cavity therebetween and cannot be separated from the inner surface of the joint pipe unit 80. Accordingly, the intake pipe structure according to the second embodiment of the present invention can avoid separation of the gas flow and can prevent ice from being accreted on the inner surface of the joint pipe unit 80, thereby making it possible to prevent ice blocks from being separated from the inner surface of the joint pipe unit 80 and to avoid the intake passage 21a from being plugged. As a result, there is neither ineffectiveness to the blow-by gas flow nor raised inner pressure of the crankcase 14.

As seen from the foregoing description, the curved surface portion 81w of the inner peripheral surface 81s of the return pipe portion 81 is gradually enlarged and curved in the direction of air flow in the intake passage 21a, and the opening 83 formed at the one end 81a of the return pipe portion 81 is opened in the downstream direction of the intake passage 21a of the intake pipe 21 with the center axis crossing the center axis C of the intake passage 21a. Accordingly, the flow in the joint pipe unit 80 is not separated from the inner surface of the joint pipe unit 80 even if the direction of the air flow in the intake passage 21a is deviated from the center axis of the intake passage 21a in the vicinity of the junction of the intake passage 21a and the return passage 58a. This makes it possible to avoid ice accretion on the inner surface of the joint pipe unit 80 stemming from the separation of the blow-by gas.

As has been explained in the above description, the intake pipe structure can avoid separation of the gas flow and can prevent ice from being accreted on the inner surface of the joint pipe unit 80, thereby making it possible to prevent ice blocks from being separated from the inner surface of the joint pipe unit 80 and to avoid the intake passage 21a from being plugged. As a result, there is neither ineffectiveness to the blow-by gas flow nor raised inner pressure of the crankcase 14 to ensure that the intake pipe structure of the internal combustion engine according to the present invention is excellent in reliability when used in the cold regions and environments.

In the present embodiment, the fact that the return pipe portion 81 is vertically arranged when connected with the intake pipe portion 82, and the crossing angle Q2 between the extension of the straight upstream surface portion 81u and the center axis C of the intake passage 21a is set at an angle of 90 degrees leads to excellent separation of water from the inner surfaces of the return and intake pipe portions.

Third Preferred Embodiment

FIG. 6 is a schematic plan view of essential portions forming part of the intake pipe structure of the internal combustion engine according to the third embodiment of the present invention, FIG. 7 is a schematic side view of essential portions forming part of the intake pipe structure of the internal combustion engine according to the third embodiment of the present invention, and FIG. 8 is a cross-sectional view taken along the lines D-D of FIG. 6. FIG. 9 is a cross-sectional view similar to FIG. 8 but showing another embodiment.

In FIGS. 6 and 7, the intake passage 21a in the intake pipe 21 and the one end portion 58e of the return passage 58a in the PCV hose 58 are shown in solid lines, respectively, while the intake pipe 21 surrounding and forming the intake passage 21a and the one end portion 58d of the PCV hose 58 surrounding and forming the one end portion 58e of the return passage 58a are shown in phantom lines, respectively.

As shown in FIGS. 6 and 7, the joint pipe unit 90 is constituted by a return pipe portion 91 and an intake pipe portion 92. The return pipe portion 91 forms the one end portion 58d of the PCV hose 58, i.e., return pipe 58 forming the return passage 58a therein, while the intake pipe portion 92 forms part of the intake pipe 21 at the upstream side of the turbocharger 25 and forming the intake passage 21a therein.

The return pipe portion 91 of the joint pipe unit 90 is connected at its one end 91a with the intake pipe portion 92. The return pipe portion 91 has an inner diameter d1, while the intake pipe portion 92 has an inner diameter d2. The return pipe portion 91 has an inner peripheral surface 91s having a first surface section 91s-L1 extending smoothly and continuously in the range of a first length L1 from the one end 91a of the return pipe portion 91 sufficiently larger than the inner diameter d1, for example, in the range of a first length L1 sufficiently larger than the inner diameter d2 of the intake pipe portion 92. Here, the expression "a first surface section 91s-L1 extending smoothly and continuously" is intended to mean that the first surface section 91s-L1 has neither annular steps nor other configurations of ledge in the range of the first length L1. It will therefore be understood that neither annular steps nor other configurations of ledge on the first surface section 91s-L1 leads to no flow cavity on the first surface section 91s-L1, thereby making it possible to prevent the accretion of ice and the separation of ice blocks from being generated on intake pipe 92 and/or the return pipe 91.

Further, the inner peripheral surface 91s of the return pipe portion 91 has a second surface section 91s-L2 extending in the range of a second length L2 smaller than the first length L1 from the one end 91a of the return pipe portion 91. The second surface section 91s-L2 has a downstream side half close to the engine 10 and an upstream side half remote from the engine 10. The second surface section 91s-L2 has a curved surface portion 91w at the downstream side half of the return pipe portion 91, the curved surface portion 91w being gradually enlarged and curved at the downstream side of the return pipe portion 91, viz., from the right side to the left side in FIG. 6, toward the one end 91a of the return pipe portion 91 to be connected with the inner peripheral surface 92s of the intake pipe portion 92. In other words, the curved surface portion 91w is gradually enlarged and curved in the direction of the air flow in the intake passage 21a of the intake pipe 21. The curved surface portion 91w has a radius of curvature Rw3 (see FIG. 7), on the cross-section taken on the lines A6-A6 in FIG. 6, set at a value almost the same as the radius r1 of the first surface section 91s-L1 of the inner peripheral surface 91s of the return pipe portion 91. The return pipe portion 91 is shown in FIGS. 6 and 7 as having an opening 93 at its one end 91a and thus opened on the inner peripheral surface 92s of the intake pipe portion 92. The opening 93 is in the form of a non-circular shape as best shown in FIG. 6. The opening 93 is enlarged and expanded in a direction angularly deviated from the center axis C of the intake passage 21a at an angle O3 (e.g. 15 degrees) between the expansion direction of the opening 93 and the center axis C of the intake passage 21a.

The inner peripheral surface 91s of the return pipe portion 91 has a straight upstream surface portion 91u in the range of a second length L2 from the one end 91s of the return pipe portion 91 at the upstream side half of the return pipe portion 91, viz., opposite to the curved surface portion 91w. The straight upstream surface portion 91u has an extension plane crossing the center axis C of the intake passage 21a at the downstream side of the straight upstream surface portion 91u. The crossing angle Q3 between the extension plane of the straight upstream surface portion 91u and the center axis C of the intake passage 21a is set at an angle of, for example, nearly 90 degrees. The straight upstream surface portion 91u of the inner peripheral surface 91s of the return pipe portion 91 is connected with the inner peripheral surface 92s of the intake pipe portion 92 at a ridge portion in the form of roughly an arc shape in cross-section and having a radius of curvature sufficiently smaller than the inner radius r1 of the return pipe portion 91.

In the intake pipe structure according to the third embodiment of the present invention mentioned above, the intake pipe portion 92 has an inner protuberant surface section 92p inclined to gradually become high toward the opening 93 of the return pipe portion 91 with the distance between the center axis C of the intake pipe portion 92 and the inner protuberant surface section 92p being diminished. The inner protuberant surface section 92p of the intake pipe portion 92 becomes wide in the circumferential direction toward the opening 93 of the return pipe portion 91. The inclination angle of the inner protuberant surface section 92p with respect to the center axis C of the intake pipe passage 21a is set at a value within the range of 5 degrees to curb the pressure loss caused by the inner protuberant surface section 92p.

More specifically, the inner protuberant surface section 92p of the intake pipe portion 92 protrudes toward the center axis C of the intake pipe passage 21a with its height gradually becoming large toward the opening 93 of the return pipe portion 91, viz., with the distance between the center axis C of the intake pipe portion 92 and the inner protuberant surface section 92p being diminished toward the opening 93 of the return pipe portion 91. The inner protuberant surface section 92p of the intake pipe portion 92 is shown in FIG. 8 to have a recess 21v on the outer peripheral surface thereof.

The inner protuberant surface section 92p of the intake pipe portion 92 at the upstream side of the opening 93 of the return pipe portion 91 becomes wide in the circumferential direction toward the opening 93 of the return pipe portion 91. The inner protuberant surface section 92p of the intake pipe portion 92 is in form of a triangular shape with the recess 21v having both sides 21va and 21vb straightly extending and gradually becoming narrow in width in the upstream direction from the opening 93 and a bottom side 21vc in close proximity of the opening 93. The recess 21v has an upstream end chamfered at a point most distant from the opening 93 as best shown in FIG. 6.

As shown in FIG. 8, the peripheral portion of the inner protuberant surface section 92p of the intake pipe portion 92, viz., the sides 21va and 21vb of the recess 21v are chamfered at their radially inward and outward corners at a radius of curvature "ri" somewhat smaller than the depth "dp" to be connected with the inner peripheral surface 92s of the intake pipe portion 92, thereby ensuring a smooth and stepless connection between the inner protuberant surface section 92p of the intake pipe portion 92 and the inner peripheral surface 92s of the intake pipe portion 92.

Although there has been described about the sides 21*va* and 21*vb* of the recess 21*v* straightly extending and gradually becoming narrow in width in the upstream direction from the opening 93 in FIG. 6, the sides 21*va* and 21*vb* of the recess 21*v* may be curved inwardly or outwardly according to the present invention.

The cross-section of the intake passage 21*a* is in the form of non-circular shape in the range of the connection zones Z1 to Z3 as shown in FIG. 7. The cross-section area of the intake passage 21*a* in the connection zone Z1 gradually decreases in the direction toward the opening 93. The cross-section area of the intake passage 21*a* in the connection zone Z2 is nearly constant in its axial direction thereof. The cross-section area of the intake passage 21*a* in the connection zone 3 gradually increases in the direction away from the opening 93. Here, the cross-section area Sd1 of the intake passage 21*a* at the immediate upstream side of the connection zone Z1 is equal to the cross-section area Sd2 of the intake passage 21*a* at the immediate downstream side of the connection zone Z3. The fluctuation of the cross-section area of the intake passage 21*a* in the connection zones Z1 to Z3 is within the range of 3%.

As has been explained in the above description, the intake pipe structure of the internal combustion engine according to the present embodiment is constructed to comprise a return pipe portion 91 having an inner peripheral surface 91*s* extending smoothly and continuously in the range of a first length L1 from the one end 91*a* of the return pipe portion 91, so that the flow of the blow-by gas is brought into tight contact with, viz., tightly fits the inner surface of the joint portion of the return passage 58*a* and the intake passage 21*a*, i.e., the inner surface of the joint pipe unit 90 with no flow cavity therebetween and cannot be separated from the inner surface of the joint pipe unit 90. Since the intake pipe portion 92 has an inner protuberant surface section 92*p* protruded and inclined at the upstream of and toward the opening 93 of the return pipe portion 91 with a recess 21*v* formed on the outer peripheral surface thereof, the inner protuberant surface section 92*p* can prevent the air flow on the inner protuberant surface section 92*p* from being introduced into the opening 93 of the return pipe portion 91. The fact that the inner protuberant surface section 92*p* of the intake pipe portion 92 at the upstream of the opening 93 of the return pipe portion 91 becomes wide in the circumferential direction toward the opening 93 leads to the fact that the air flow on the inner protuberant surface section 92*p* can be prevented from being introduced into the opening 93 of the return pipe portion 91 due to the air flow deviated away from the inner protuberant surface section 92*p*. Therefore, the intake pipe structure according to the present invention can prevent ice from being accreted on the inner surface of the joint pipe unit 90, and can prevent ice blocks from being separated from the inner surface of the joint pipe unit 90. As a result, there is neither ineffectiveness to the blow-by gas flow nor raised inner pressure of the crankcase 14.

As seen from the foregoing description, the curved surface portion 91*w* of the inner peripheral surface 91*s* of the return pipe portion 91 is gradually enlarged and curved in the direction of air flow in the intake passage 21*a*, and the opening 93 formed at the one end 91*a* of the return pipe portion 91 is opened in the downstream direction of the intake passage 21*a* of the intake pipe 21 with the center axis crossing the center axis C of the intake passage 21*a*. Accordingly, the flow in the joint pipe unit 90 is not separated from the inner surface of the joint pipe unit 90 even if the direction of the air flow in the intake passage 21*a* is deviated from the center axis of the intake passage 21*a* in the vicinity of the junction of the intake passage 21*a* and the return passage 59*a*. This makes it possible to avoid ice accretion on the inner surface of the joint pipe unit 90 stemming from the separation of the blow-by gas.

From the foregoing description about the present embodiment, it will be understood that the intake pipe structure according to the present embodiment can avoid ice accretion on the inner surface of the joint pipe unit 90 stemming from the separation of the blow-by gas in a similar manner to the first and second embodiments mentioned above. As a result, there is neither ineffectiveness to the blow-by gas flow nor raised inner pressure of the crankcase 14 to ensure that the intake pipe structure according to the present invention is excellent in reliability when used in the cold regions and environments.

While there has been described about the third embodiment in which the inner protuberant surface section 92*p* of the intake pipe portion 92 in form of a triangular shape with the recess 21*v* having both sides 21*va*, 21*vb* and the bottom side 21*vc* forms an inclined portion in the vicinity of the opening 93 of the return pipe portion 91, the inclined portion may be replaced by an inclined portion 92*h* having a flat surface on the inner peripheral surface of the intake pipe portion 92 as shown in FIG. 9 with respect to the inclined portion formed as shown in FIG. 8. The area of the flat surface of the inclined portion 92*h* may be larger than that of the recess 21*v*, viz., the inclined portion formed by the inner protuberant surface section 92*p* of the intake pipe portion 92 as shown in FIGS. 6 to 8.

The inclined portion 92*h* of the intake pipe portion 92 is inclined with the distance between the flat surface of the inclined portion 92*h* and the center axis C of the intake passage 21*a* decreasing toward the opening 93 of the return pipe portion 91. In lieu of this case, the intake pipe portion 92 at the upstream side of the junction point of the return passage 58*a* and the intake passage 21*a*, viz., at the upstream side of the opening 93 may be arranged with respect to the return pipe portion 91 to have its center axis inclined with respect to the center axis of the return pipe portion 91 in a direction decreasing an angle Q3 between the center axis of the intake pipe portion 92 and the center axis of the return pipe portion 91. In this case, the angle between the straight portion Cz (see FIG. 7) of the center axis C of the intake passage 21*a* and the center axis of the return passage 58*a* in the vicinity of the crossing point of the above axes of the intake passage 21*a* and the return passage 58*a* is 90 degrees, while the angle between the center axis C of the intake passage 21*a* at the upstream of the opening 93 and the center axis of the return passage 58*a* is less than 90 degrees. For this reason, the air flow adjacent to the opening 93 is deviated from the center axis C of the intake passage 21*a*.

As has been described, the intake pipe structure of the internal combustion engine according to the present invention is provided with an return pipe portion having an inner peripheral surface having a first surface section extending smoothly and continuously in the range of a first length from the one end of the return pipe portion and a second surface section extending in the range of a second length smaller than the first length from the one end of the return pipe portion and a curved surface portion at the downstream side half of the return pipe portion, the curved surface portion being gradually enlarged and curved at the downstream side of the return pipe portion. Further, the intake pipe structure of the internal combustion engine according to the present invention is provided with an return pipe portion having an inner peripheral surface having a first surface section extending smoothly and continuously in the range of a first length from the one end of the return pipe portion and an intake pipe portion having an inner protuberant surface section inclined to gradually become high toward the opening of the return pipe portion. The intake pipe structure of the internal combustion engine thus constructed above makes it possible to avoid the flow in the joint pipe unit from being separated from the inner surface of the joint pipe unit, to prevent the air flow from being introduced into the opening of the return pipe portion due to the air flow deviated away from the inner protuberant surface section, and to prevent ice from being accreted on the inner surface of the joint pipe unit. Further, there is neither ineffectiveness to the blow-by gas flow nor raised inner pressure of the crankcase to ensure that the intake pipe structure according to the present invention is excellent in reliability when used in the cold regions and environments.

INDUSTRIAL APPLICABILITY OF THE INVENTION

The previously mentioned advantage is useful for various types of intake pipe structure of the internal combustion engine having the blow-by gas introduced therethrough.

The invention claimed is:

1. An intake pipe structure of an internal combustion engine, comprising: a joint pipe unit for communicating an intake passage for introducing air into said internal combustion engine with a return passage for returning blow-by gas from said internal combustion engine to said intake passage,
    said joint pipe unit being constituted by an intake pipe portion forming said intake passage therein, and a return pipe portion forming said return passage therein and including a first end which is connected with said intake pipe portion and which has an opening opened to said intake pipe portion,
    said return pipe portion having an inner diameter and an inner peripheral surface,
    a center axis of said intake pipe portion near said first end and a center axis of said return pipe portion lying on a common plane,
    said inner peripheral surface of said intake pipe portion having a first surface section spaced from said first end of said return pipe portion, and extending smoothly and continuously without annular steps or other configurations of a ledge, within the range of a first length which is set from said first end and is larger than said inner diameter,
    said inner peripheral surface having a second surface section extending from said first surface section to said first end of said return pipe portion, within the range of a second length which is set from said first end of said return pipe portion and which is smaller than said first length,
    said second surface section having a curved surface portion gradually enlarged and curved at the downstream side of said return pipe portion to smoothly continue the surface of said first surface section to an inner peripheral surface of said intake pipe portion, thereby enlarging said opening at the downstream side in such a manner that said opening is in the form of a non-circular shape,
    said curved surface portion having a maximum extent of enlargement towards an expansion direction, so that said opening has a maximum extent of enlargement in said expansion direction,
    said expansion direction does not lie on said common plane, rather said expansion direction angularly deviates from the center axis of said intake pipe portion.

2. The intake pipe structure as defined in claim 1, wherein said intake pipe portion is curved at the upstream side of said opening, and wherein said expansion direction of said opening is set based on the shape of said curved intake pipe portion to be the direction of air flow in the vicinity of said opening of said intake pipe portion, and said expansion direction crossing the center axis of said intake pipe portion and the center axis of said inner peripheral surface of said return pipe portion.

3. The intake pipe structure as defined in claim 1, wherein said inner peripheral surface of said return pipe portion has a straight upstream surface section in the range of said second length from said first end of said return pipe portion and positioned at the upstream side of said intake pipe portion, said straight upstream surface section having an extension plane crossing the center axis of said intake pipe portion at a crossing angle set equal to or less than 90 degrees between said extension plane of said straight upstream surface section and said center axis of said intake pipe portion at the upstream side of said extension plane.

4. The intake pipe structure as defined in claim 1, wherein said intake pipe portion has an inner protuberant surface section positioned at the upstream side of and in the vicinity of said opening of said return pipe portion and inclined with the distance between the center axis of said intake pipe portion and said inclined inner protuberant surface section diminished toward said opening of said return pipe portion.

5. An intake pipe structure of an internal combustion engine, comprising: a joint pipe unit for communicating an intake passage for introducing air into said internal combustion engine with a return passage for returning blow-by gas from said internal combustion engine to said intake passage,
    said joint pipe unit being constituted by an intake pipe portion forming said intake passage therein, and a return pipe portion forming said return passage therein and including one end which is connected with said intake pipe portion and which has an opening opened to said intake portion,
    a center axis of said intake pipe portion near said one end and a center axis of said return pipe portion lying on a common plane,
    said return pipe portion having an inner diameter and an inner peripheral surface, said inner peripheral surface of said intake pipe portion extending smoothly and continuously from said one end of said return pipe portion in the range of a first length larger than the inner diameter thereof, and said one end of said return pipe portion having said opening opened to the inner peripheral surface of said intake pipe portion in the form of a non-circular shape,
    said opening being enlarged and curved in an expansion direction angularly deviated from the center axis of said intake passage toward the downstream side of said intake pipe portion,
    said opening has a maximum extent of enlargement in an expansion direction, said expansion direction does not lie on said common plane, rather said expansion direction angularly deviates from the center axis of said intake pipe portion,
    said intake pipe portion having an inner protuberant surface section positioned at the upstream side of and in the vicinity of said opening of said return pipe portion and protruding into said intake passage to have a recess formed therein,
    said inner protuberant surface section of said intake pipe portion becoming wide in the circumferential direction of said intake pipe portion toward said opening of said return pipe portion with said recess wider in the circumferential direction of said intake pipe portion toward said opening of said return pipe portion at the upstream side of said opening of said return pipe portion.

6. The intake pipe structure as defined in claim 5, wherein said inner protuberant surface section of said intake pipe portion is inclined with the distance between the center axis of said intake pipe portion and said inner protuberant surface section diminished toward said opening of said return pipe portion.

7. The intake pipe structure as defined in claim 5, wherein said intake pipe portion is curved at the upstream side of said opening, and wherein said expansion direction of said opening is set based on the shape of said curved intake pipe portion to be the direction of air flow in the vicinity of said opening of said return pipe portion, said expansion direction of said opening crossing the center axis of said intake pipe portion and the center axis of said inner peripheral surface of said return pipe portion.

8. The intake pipe structure as defined in claim 5, wherein said inner peripheral surface of said return pipe portion has a curved surface portion extending in the range of a second length smaller than said first length from said one end of said return pipe portion and continuing to said inner peripheral surface of said intake pipe portion to be gradually enlarged and curved in the downstream direction of said intake pipe portion.

9. The intake pipe structure as defined in claim 5, wherein said inner protuberant surface section of said intake pipe portion is in form of a triangular shape.

* * * * *